M. Jincks,
Wood Auger.
No. 63,392. Patented Apr. 2, 1867.
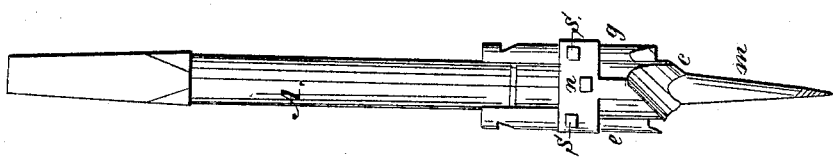
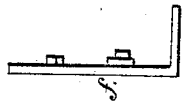
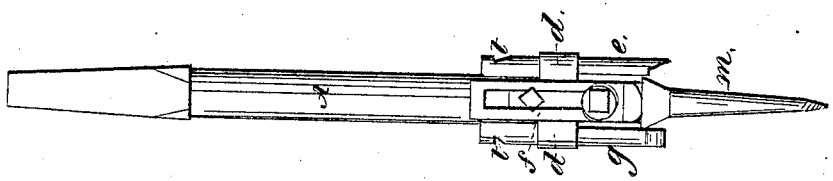
Witnesses:
Inventor:
Melvin Jincks
Per T. H. Alymon & Co. Atty

United States Patent Office.

MELVIN JINCKS, OF DANVILLE, NEW YORK.

Letters Patent No. 63,892, dated April 2, 1867.

---

IMPROVEMENT IN BORING-BITS.

---

The Schedule referred to in these Letters Patent and making part of the same.

---

TO ALL WHOM IT MAY CONCERN:

Be it known that I, MELVIN JINCKS, of Danville, Livingston county, New York, have invented certain new and useful improvements in Countersinks; and I hereby declare that the following is a true, full, and exact description of the same, reference being had to the accompanying drawings, and to the letters of reference marked thereon.

Figure 1 represents a plan view of my countersink.

Figure 2 is a similar view of the opposite side.

Figure 3 represents a side elevation of the gauge.

The letter A, in the annexed drawings, represents the shank of my countersink, which is made four square at the upper end and tapering so as to enter a carpenter's brace. The lower end of the shank A is for about an inch of the end made larger than the remaining portion, and is furnished with the two projections $d\ d$, which are forged solid with the shank A. Through each of the projections $d$ an opening is made to receive into one opening the marker $e$, and into the other the cutter $g$. The marker $e$ and cutter $g$ are prevented from having a lateral motion by resting at bottom in a longitudinal groove cut into the lower end of shank A. Both the cutter $g$ and marker $e$ are made adjustable by screws $s$, which pass through the projections $d$. The marker $e$, it will be observed, terminates in a cutting edge which penetrates easily into the wood, while the cutter $g$, acting at right angles with marker $e$, reduces the borings or chips to such small proportions as that they easily escape upwards by the action of the countersink. In the back of marker $e$ and cutter $g$ an indentation, $t$, is made to facilitate their withdrawal from projections $d$. Into the lower end of shank A a hole is made to receive the gimlet-shaped bit $m$, which is confined in its place by the screw $n$. One side of the lower end of shank A is scooped out, (as seen in fig. 2,) having an oblique cutting edge at the point $c$. This scooped end is intended to receive and convey off the borings collecte in the concave side of bit $m$. Opposite the scoop, as above described, the end of shank A slopes down and forms a cutting edge at the point where the bit $m$ enters the shank. In order to regulate the depth of the hole the gauge $f$ is provided. (See fig. 3.) The gauge $f$ has a longitudinal slot in it, through which two screws pass and enter the shank A. By this arrangement the gauge $f$ can be adjusted to suit the wishes of the operator.

In operating my countersink a hole will be cut by the cutting edges at the lower end of shank A, and will be enlarged by the marker $e$ and cutter $g$. The depth of the hole will be regulated by suitably adjusting the gauge $f$.

Having thus described my countersink, what I claim, and desire to secure by Letters Patent, is—

The shank A, as constructed, in combination with gauge $f$, cutter $g$, marker $e$, and an adjustable bit, substantially as and for the purpose described.

In testimony that I claim the foregoing as my own I hereby affix my signature in the presence of two witnesses.

MELVIN JINCKS.

Witnesses:
O. TOUSEY,
S. D. WHITE.